United States Patent
Goshorn et al.

(10) Patent No.: US 6,454,535 B1
(45) Date of Patent: Sep. 24, 2002

(54) BLISK

(75) Inventors: David Andrew Goshorn, Erlanger, KY (US); David William Crall, Loveland, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/702,394

(22) Filed: Oct. 31, 2000

(51) Int. Cl.[7] .............................. B63H 1/16; F03B 3/12
(52) U.S. Cl. ................... 416/193 R; 416/234; 416/203
(58) Field of Search .................. 416/234, 189, 416/196 R, 203

(56) References Cited

U.S. PATENT DOCUMENTS

| 1,263,473 A | 4/1918 | Schellens | 415/77 |
| 1,544,318 A | 6/1925 | Hodgkinson | 416/193 R |
| 2,999,631 A | 9/1961 | Wollmershauser | 416/191 |
| 3,070,284 A | 12/1962 | Kent | 416/171 |
| 3,768,933 A | 10/1973 | Bouiller et al. | 417/408 |
| 4,068,471 A | 1/1978 | Simmons | 60/262 |
| 5,562,419 A | 10/1996 | Crall et al. | 416/190 |
| 5,988,980 A | 11/1999 | Busbey et al. | 416/193 R |
| 6,250,883 B1 * | 6/2001 | Robinson et al. | 416/198 A |

FOREIGN PATENT DOCUMENTS

| GB | 585331 | 2/1947 |
| GB | 586552 | 3/1947 |
| GB | 1338347 | 11/1973 |
| LI | 660 207 A5 | 3/1987 |
| SU | 612056 | 6/1978 |

* cited by examiner

*Primary Examiner*—Edward K. Look
*Assistant Examiner*—Kimya N McCoy
(74) *Attorney, Agent, or Firm*—Sonnenschein Nath & Rosenthal

(57) ABSTRACT

A blisk for use in a turbine engine. The blisk includes an annular disk, an inner row of blades including a plurality of circumferentially spaced airfoils integrally formed with the disk, an annular splitter integrally formed with the inner row of blades and surrounding the tips of the plurality of airfoils thereof, and an outer row of blades including a plurality of circumferentially spaced airfoils integrally formed with the splitter. There are more airfoils in the outer row of blades than in the inner row of blades.

8 Claims, 5 Drawing Sheets

BLISK

The United States government has rights in this invention under Contract No. F33615-94-C-2506 awarded by the United States Air Force.

BACKGROUND OF THE INVENTION

The present invention relates generally to integrally formed bladed disks or "blisks" for turbine engines, and more particularly to a blisk having an integral splitter.

A conventional gas turbine engine includes a high pressure compressor for compressing air traveling through the engine, a combustor downstream from the compressor for heating the compressed air, and a high pressure turbine downstream from the combustor for driving the high pressure compressor. One type of engine, known as a bypass turbofan engine, also has a low pressure turbine downstream from the high pressure turbine for driving a fan upstream from the high pressure compressor. In a variable cycle engine, the first stage of the high pressure compressor is a core driven fan stage. The flowpath of the variable cycle engine is split at the core driven fan stage so it has concentric inner and outer ducts. The amount of air passing through the outer duct can be adjusted to change the thrust and fuel consumption of the engine.

As disclosed in U.S. Pat. No. 5,988,980, which is hereby incorporated by reference, a core driven fan stage includes inner and outer airfoils positioned in the inner and outer ducts, respectively. A generally cylindrical splitter positioned between the inner and outer airfoils forms part of the inner flowpath surface of the outer duct and part of the outer flowpath surface of the inner duct. Some prior art core driven fans are formed from a single piece of material so the inner and outer airfoils, the splitter and a disk are integral. Such an integrally bladed disk is commonly referred to as a "blisk".

In the past, core driven fan stage blisks have been made with an equal number of inner and outer airfoils so each outer airfoil is radially aligned with a corresponding inner airfoil. Further, each outer airfoil of the prior art blisks has a midspan chord length which is almost as long as (i.e., greater than 80 percent of) the midspan chord length of the inner airfoils. As those skilled in the art will appreciate, the midspan chord length is a straight line distance measured from a point at a leading edge of the airfoil halfway along its span (i.e., radial height) to a point at a trailing edge of the airfoil halfway along its span. Because the outer airfoil chord lengths of the prior art blisks are so long relative to the inner airfoil chord lengths, the leading and trailing edges of the inner airfoils have high stresses, particularly at the tips of the inner airfoils. Previous attempts to reduce these stresses have included forming a groove in the leading and trailing edges of the splitter as disclosed in U.S. Pat. No. 5,988,980.

SUMMARY OF THE INVENTION

Among the several features of the present invention may be noted the provision of a blisk for use in a turbine engine. The blisk includes an annular disk having a hub surrounding a central opening, a web extending generally radially outward from the hub and a rim surrounding the web. In addition, the blisk comprises an inner row of blades including a plurality of circumferentially spaced airfoils integrally formed with the disk. Each of the airfoils of the inner row of blades extends generally radially outward from a root positioned adjacent the rim of the disk to a tip opposite the root. Further, the blisk includes an annular splitter integrally formed with the inner row of blades and surrounding the tips of the plurality of airfoils thereof. The splitter has an inner surface facing the tips of the plurality of airfoils of the inner row of blades and an outer surface opposite the inner surface. Still further, the blisk includes an outer row of blades including a plurality of circumferentially spaced airfoils integrally formed with the splitter. Each of the airfoils of the outer row of blades extends generally radially outward from a root positioned adjacent the outer surface of the splitter to a tip opposite the root. There are more airfoils in the outer row of blades than in the inner row of blades.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
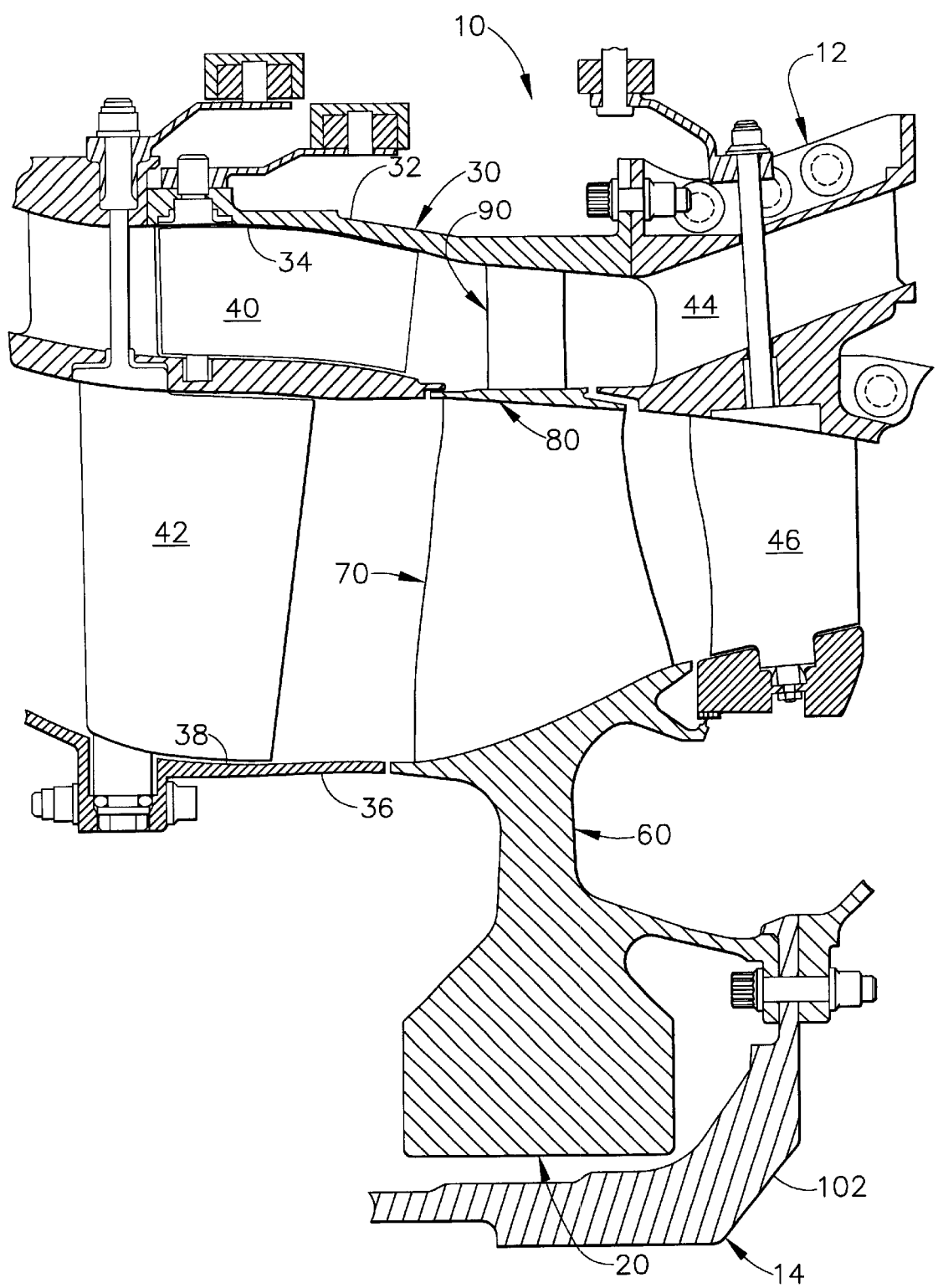
FIG. 1 is a partial vertical cross section of a gas turbine engine having a blisk of the present invention.

Referring now to the drawings and in particular to FIG. 1, a variable cycle gas turbine engine (partially shown) is designated in its entirety by the reference number 10. The engine 10 has a stator (generally designated by 12) and a high pressure or core rotor (generally designated by 14) rotatably mounted on the stator. The core rotor 14 includes an integrally bladed disk or "blisk", generally designated by 20, which is the subject of the present invention.

The stator 12 includes a frame, generally designated by 30, upstream from the blisk 20. The frame 30 includes an outer duct, generally designated by 32, defining an outer flowpath passageway 34 and an inner duct, generally designated by 36, defining an inner flowpath passageway 38. A plurality of circumferentially spaced outer variable pitch stator vanes 40 and a plurality of circumferentially spaced inner variable pitch stator vanes 42 are pivotally mounted in-the outer flowpath passageway 34 and the inner flowpath passageway 38, respectively, for directing flow upstream from the blisk 20. A plurality of circumferentially spaced outer stationary stator vanes 44 is mounted downstream from the blisk for directing flow through the outer passageway 34, and a plurality of circumferentially spaced inner variable pitch stator vanes 46 is pivotally mounted downstream from the blisk 20 for directing flow through the inner passageway 38. The amount of air passing through the outer passageway 34 can be adjusted to change the thrust and fuel consumption of the engine 10. As the features of the stator 12 are conventional, they will not be described in further detail.

Figure 2:
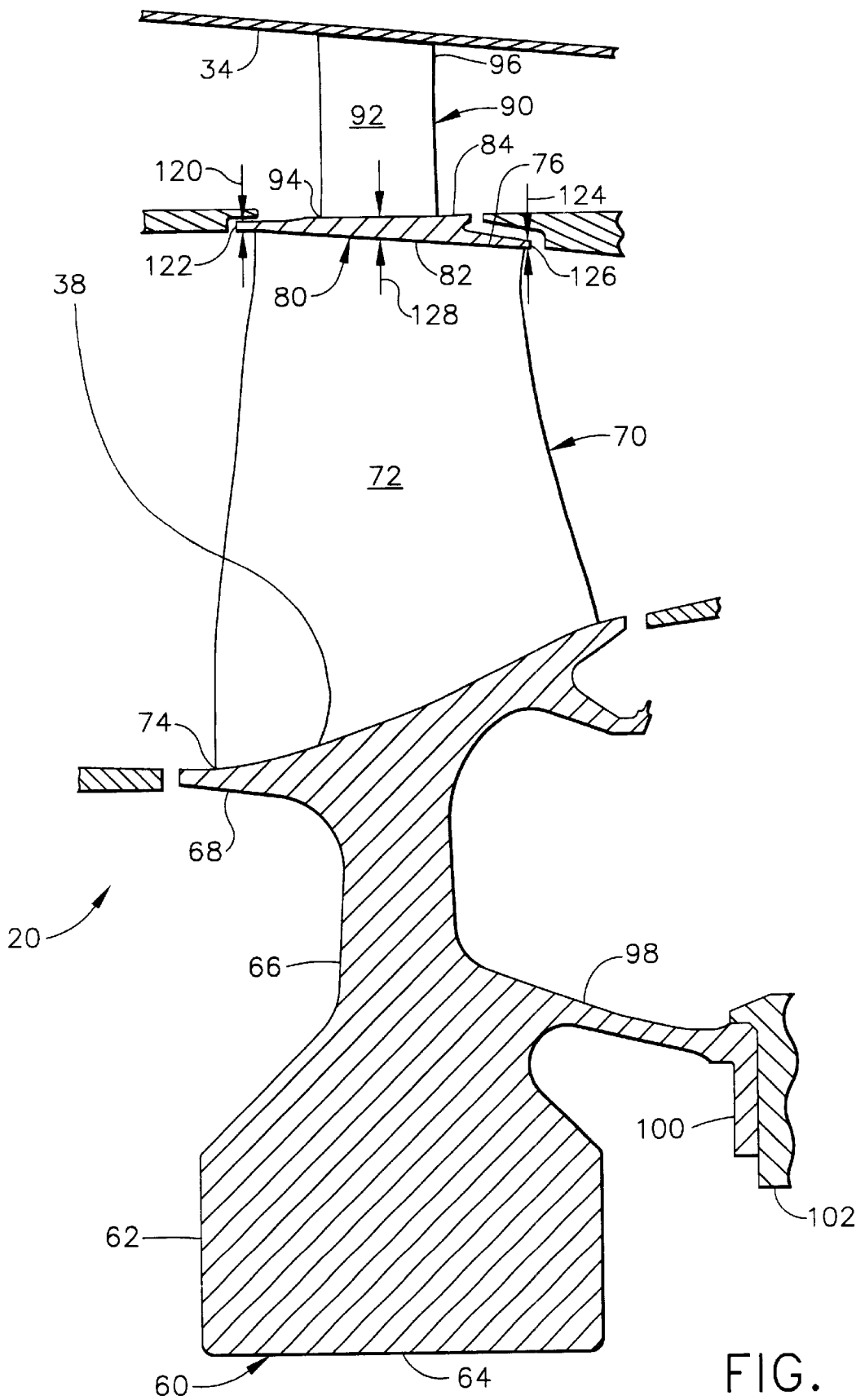
FIG. 2 is a cross section of the blisk.

As illustrated in FIG. 2, the blisk 20 includes an annular disk, generally designated by 60, having a hub 62 surrounding a central opening 64, a web 66 extending generally radially outward from the hub and a rim 68 surrounding the web. An inner row of blades, generally designated by 70, including a plurality of circumferentially spaced airfoils 72, is integrally formed with the disk 60 as part of the rim 68. Each of the airfoils 72 of the inner row of blades 70 extends generally radially outward from a root 74 positioned adjacent the rim 68 of the disk 60 to a tip 76 opposite the root. The blisk 20 also includes an annular splitter, generally designated by 80, integrally formed with the inner row of blades 70 and surrounding the tips 76 of the airfoils 72. The splitter 80 has an inner surface 82 facing inward toward the tips 76 of the airfoils 72 of the inner row of blades 70 and an outer surface 84 opposite the inner surface. An outer row of blades 90 including a plurality of circumferentially spaced airfoils 92 is integrally formed with the splitter 80. Each of the airfoils 92 of the outer row of blades 90 extends generally radially outward from a root 94 positioned adjacent the outer surface 84 of the splitter 80 to a tip 96 opposite the root. The blisk 20 also includes an arm 98 which extends rearward to a flange 100 configured for connecting the blisk to a shaft 102 which extends axially through the engine 10 to the high pressure turbine (not shown).

Figure 3:
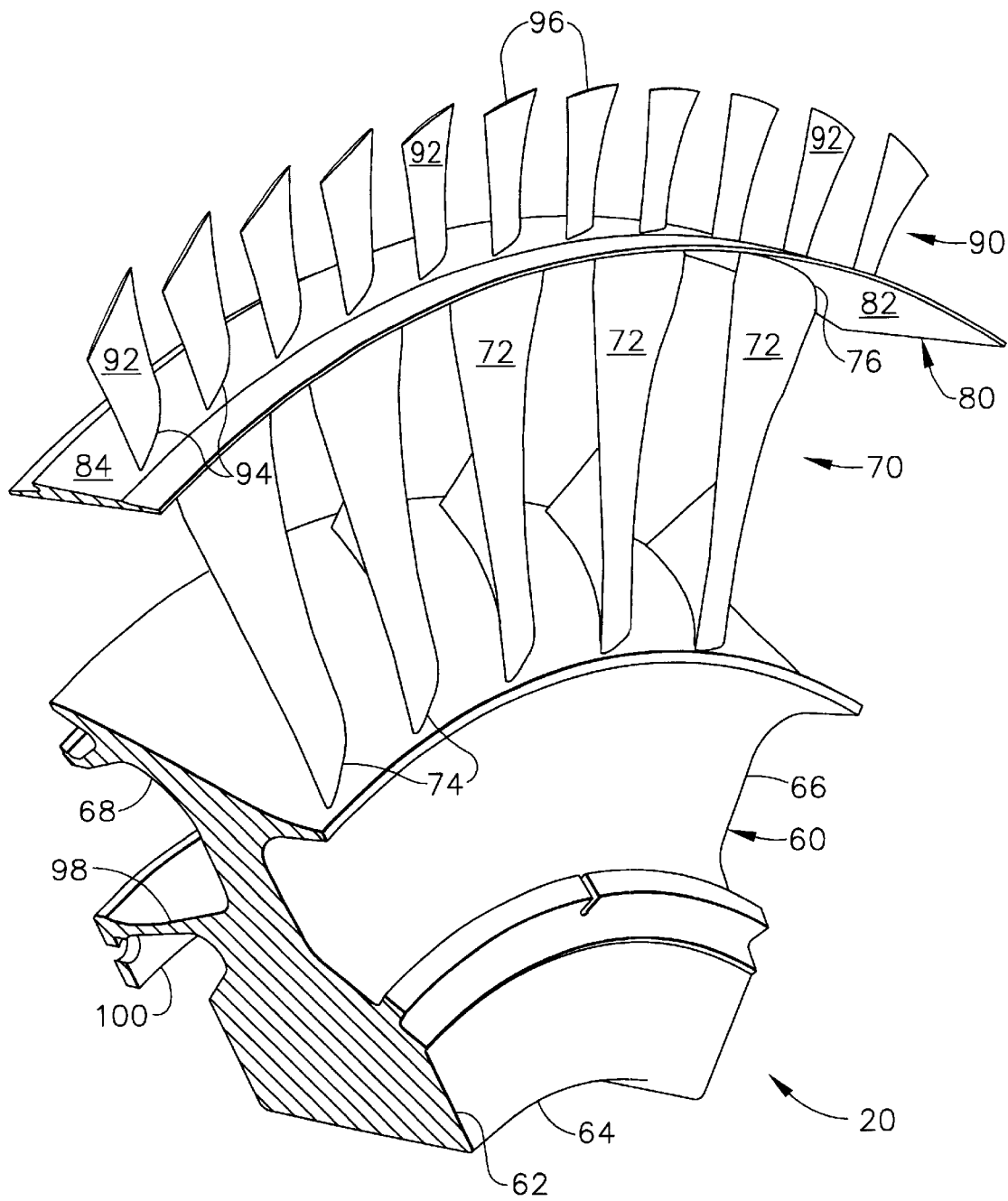
FIG. 3 is an aft facing perspective of a sector of a blisk of the present invention.
Figure 4:
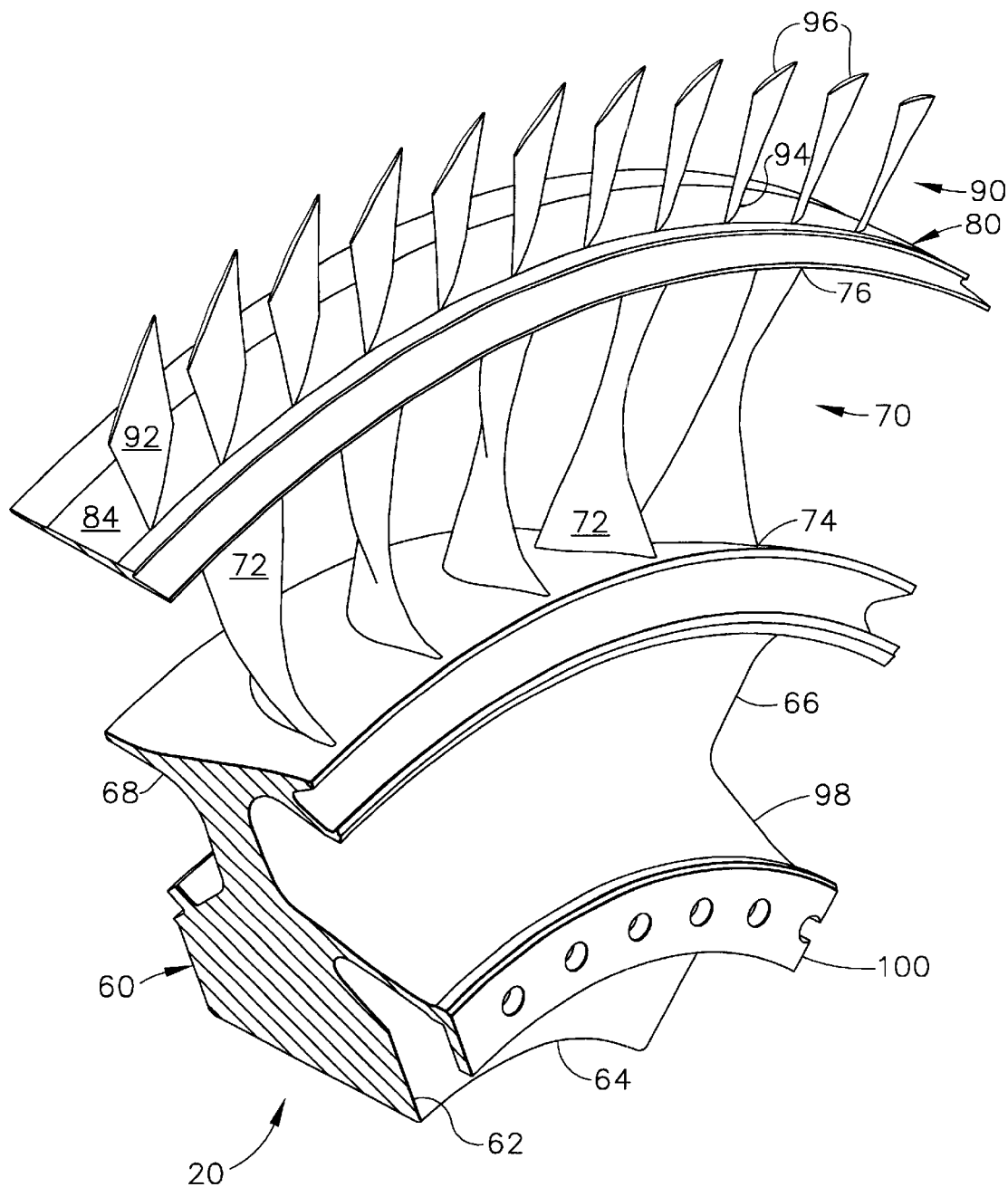
FIG. 4 is a forward facing perspective of the sector of the blisk.

As shown in FIGS. 3 and 4, there are more airfoils 92 in the outer row of blades 90 than there are airfoils 72 in the inner row of blades 70. In one embodiment, there are twice as many airfoils 92 in the outer row of blades 90 as there are in the inner row of blades 70. In the illustrated embodiment, half of the airfoils 92 in the outer row of blades 90 are positioned directly radially outboard from the airfoils 72 in the inner row of blades 70, and the other half of the airfoils in the outer row of blades are positioned halfway between the first half of the airfoils. As will be appreciated by those skilled in the art, this configuration minimizes stress in the splitter 80 and maximizes fatigue life.

Figure 5:
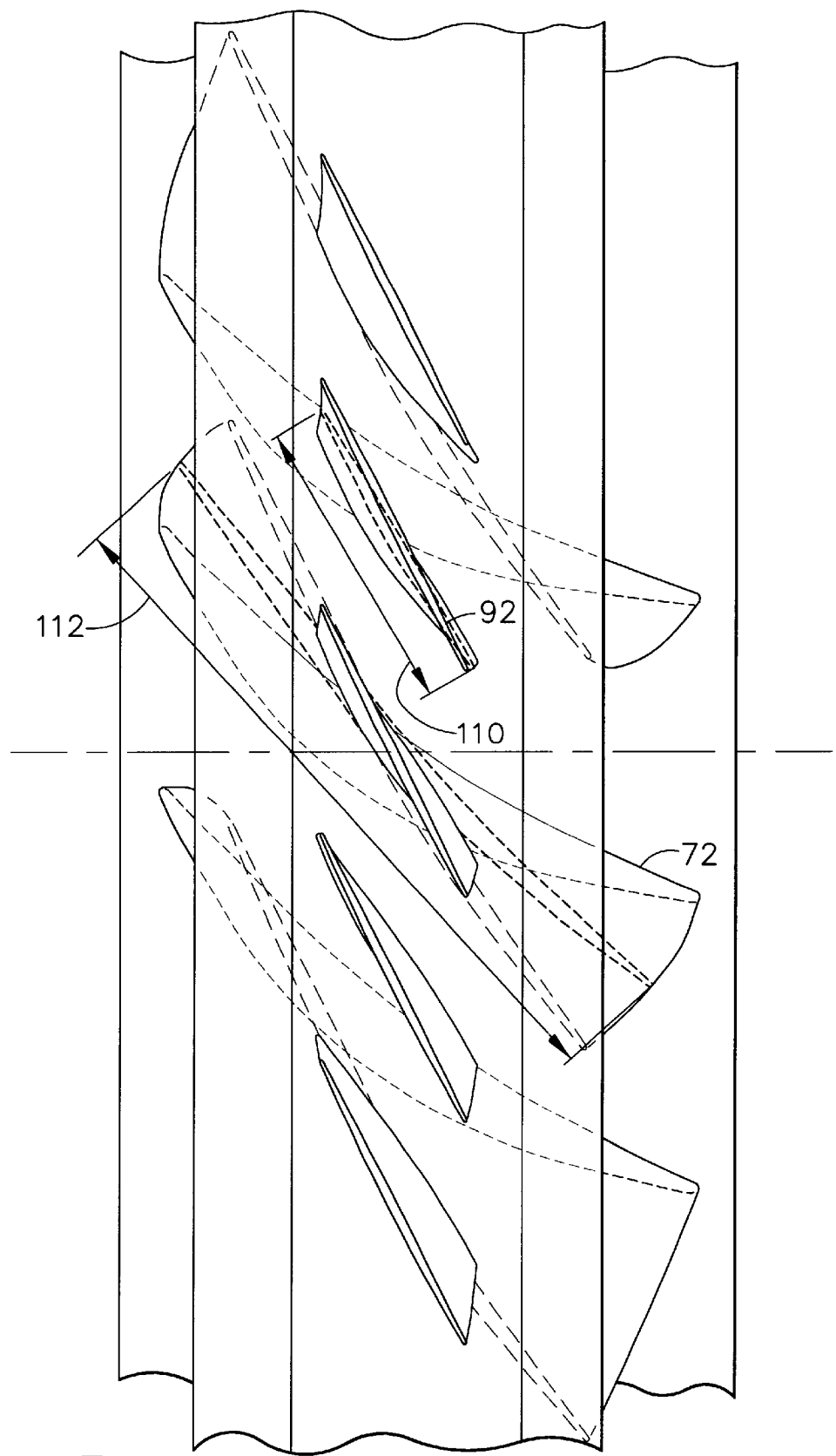
FIG. 5 is a schematic of an inner airfoil profile and an outer airfoil profile of the blisk.

As illustrated in FIG. 5, each airfoil 92 in the outer row of blades 90 has a midspan chord length 110 less than about 75 percent of a midspan chord length 112 of the airfoils 72 in the inner row of blades 70. In one embodiment, the midspan chord length 110 of the outer airfoils 92 is less than about 60 percent of the midspan chord length 112 of the inner airfoils 72. In one embodiment, the midspan chord length 110 of the outer airfoils 92 is about 54 percent of the midspan chord length 112 of the inner airfoils 72. As will be appreciated by those skilled in the art, the stresses in the inner airfoils 72 are reduced by reducing the chord length 110 of the outer airfoils 92. The fatigue life of the airfoils is improved by decreasing their peak stresses. In addition, increasing the number of outer airfoils provides increased tip airfoil solidity which may provide increased performance relative to a blisk having an equal number of inner and outer airfoils.

As illustrated in FIG. 2, the splitter 80 has a thickness 120 at a leading edge 122, a thickness 124 at a trailing edge 126 and a thickness 128 halfway between the leading and trailing edges. To further reduce loading on the inner row of blades 70, the thicknesses 120, 124 at the leading and trailing edges 122, 126, respectively, are thinner than the thickness 128 of the splitter 80 immediately inboard from the outer row of blades 90. As will be appreciated by those skilled in the art, the thickness 128 of the splitter 80 inboard from the blades 90 can be optimized to obtain a desired fatigue life.

Although the blisk 20 may be made using other methods without departing from the scope of the present invention, in one embodiment the blisk is formed from a single piece of material (e.g., by milling on a numerically controlled machine) so that the inner and outer airfoils, the splitter and a disk are integral. Further, the blisk may be made of any conventional material used to manufacture gas turbine engine rotor components (e.g., a titanium or nickel base alloy) without departing from the scope of the present invention.

Although the blisk 20 described above is used in a compressor section of the engine as a core driven fan stage, those skilled in the art will appreciate that the present invention may also be applied to other portions of a gas turbine engine 10 such as in the fan section or the turbine section.

When introducing, elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A blisk for use in a turbine engine comprising:

an annular disk having a hub surrounding a central opening, a web extending generally radially outward from the hub and a rim surrounding the web;

an inner row of blades including a plurality of circumferentially spaced airfoils integrally formed with the disk, each of said airfoils of said inner row of blades extending generally radially outward from a root positioned adjacent the print of the disk to a tip opposite the root;

an annular splitter integrally formed with the inner row of blades and surrounding the tips of said plurality of airfoils thereof, said splitter having an inner surface facing the tips of the plurality of airfoils of the inner row of blades and an outer surface opposite said inner surface; and an outer row of blades including a plurality of circumferentially spaced airfoils integrally formed with the splitter, each of said airfoils of said outer row of blades extending generally radially outward from a root positioned adjacent the outer surface of the splitter to a tip opposite the root, wherein there are more airfoils in said outer row of blades than in said inner row of blades and each airfoil in said outer row of blades has a midspan chord length less than about 75 percent of a midspan chord length of the airfoils in said inner row of blades.

2. A blisk as set forth in claim 1 wherein there are twice as many airfoils in said outer row of blades as in said inner row of blades.

3. A blisk as set forth in claim 2 wherein each of one half of the airfoils in said outer row of blades is positioned directly radially outboard from one of the airfoils in said inner row of blades.

4. A blisk as set forth in claim 1 wherein the midspan chord length of each airfoil in said outer row of blades is less than about 60 percent of the midspan chord length of the airfoils in said inner row of blades.

5. A blisk as set forth in claim 4 wherein the midspan chord length of each airfoil in said outer row of blades is about 54 percent of the midspan chord length of the airfoils in said inner row of blades.

6. A blisk as set forth in claim 1 wherein the splitter has a thickness at a leading edge, a thickness at a trailing edge and a thickness halfway between the leading and trailing edges, and wherein the thickness halfway between the leading and trailing edges is greater than the thicknesses at the leading and trailing edges.

7. A blisk as set forth in claim 1 wherein said inner and outer rows of blades are configured for use as a core driven fan stage.

8. A blisk as set forth in claim 1 in combination with the turbine engine.

* * * * *